US011281393B2

(12) United States Patent
Abdul Rasheed et al.

(10) Patent No.: US 11,281,393 B2
(45) Date of Patent: *Mar. 22, 2022

(54) ENVOY FOR MULTI-TENANT COMPUTE INFRASTRUCTURE

(71) Applicant: Rubrik Inc., Palo Alto, CA (US)

(72) Inventors: Abdul Jabbar Abdul Rasheed, Palo Alto, CA (US); Soham Mazumdar, Palo Alto, CA (US); Hardik Vohra, Palo Alto, CA (US); Mudit Malpani, Mountain View, CA (US)

(73) Assignee: Rubrik, Inc., Palo Alto, CA (US)

( * ) Notice: Subject to any disclaimer, the term of this patent is extended or adjusted under 35 U.S.C. 154(b) by 95 days.

This patent is subject to a terminal disclaimer.

(21) Appl. No.: 16/200,505

(22) Filed: Nov. 26, 2018

(65) Prior Publication Data

US 2019/0384494 A1 Dec. 19, 2019

Related U.S. Application Data

(63) Continuation of application No. 16/008,972, filed on Jun. 14, 2018, now Pat. No. 10,168,949.

(51) Int. Cl.
| | |
|---|---|
| *G06F 9/455* | (2018.01) |
| *G06F 9/46* | (2006.01) |
| *G06F 3/06* | (2006.01) |
| *H04L 9/32* | (2006.01) |
| *H04L 29/06* | (2006.01) |
| *G06F 9/48* | (2006.01) |
| *G06F 11/14* | (2006.01) |

(52) U.S. Cl.
CPC ............. *G06F 3/065* (2013.01); *G06F 3/067* (2013.01); *G06F 3/0619* (2013.01);
(Continued)

(58) Field of Classification Search
CPC ...... G06F 3/065; G06F 3/0619; G06F 3/0664; G06F 3/067; G06F 9/45558;
(Continued)

(56) References Cited

U.S. PATENT DOCUMENTS

| | | | |
|---|---|---|---|
| 9,442,937 B2 * | 9/2016 | Chelur | ................... G06F 3/0665 |
| 10,168,949 B1 | 1/2019 | Abdul Rasheed et al. | |

(Continued)

OTHER PUBLICATIONS

U.S. Appl. No. 16/008,972 U.S. Pat. No. 10,168,949, filed Jun. 14, 2018, Envoy for Multi-Tenant Compute Infrastructure.

(Continued)

*Primary Examiner* — Bradley A Teets
(74) *Attorney, Agent, or Firm* — Holland & Hart LLP

(57) ABSTRACT

A data management and storage (DMS) cluster of peer DMS nodes manages data of a tenant of a multi-tenant compute infrastructure. The compute infrastructure includes an envoy connecting the DMS cluster to virtual machines of the tenant executing on the compute infrastructure. The envoy provides the DMS cluster with access to the virtual tenant network and the virtual machines of the tenant connected via the virtual tenant network for DMS services such as data fetch jobs to generate snapshots of the virtual machines. The envoy sends the snapshot from the virtual machine to a peer DMS node via the connection for storage within the DMS cluster. The envoy provides the DMS cluster with secure access to authorized tenants of the compute infrastructure while maintaining data isolation of tenants within the compute infrastructure.

17 Claims, 13 Drawing Sheets

(52) U.S. Cl.
CPC ........ *G06F 3/0664* (2013.01); *G06F 9/45558* (2013.01); *G06F 9/4843* (2013.01); *G06F 11/14* (2013.01); *H04L 9/3268* (2013.01); *H04L 63/10* (2013.01); *H04L 63/102* (2013.01); *G06F 2009/45562* (2013.01); *G06F 2009/45579* (2013.01); *H04L 63/0428* (2013.01); *H04L 63/0823* (2013.01); *H04L 63/168* (2013.01)

(58) Field of Classification Search
CPC ................... G06F 9/4843; G06F 11/14; G06F 2009/45562; G06F 2009/45579; H04L 9/3268; H04L 63/10; H04L 63/102; H04L 63/0428; H04L 63/0823; H04L 63/168
USPC ..................................................... 718/104, 1
See application file for complete search history.

(56) References Cited

U.S. PATENT DOCUMENTS

| | | | | |
|---|---|---|---|---|
| 2011/0302415 | A1* | 12/2011 | Ahmad | H04L 9/0825 713/168 |
| 2013/0290960 | A1 | 10/2013 | Astete et al. | |
| 2015/0188943 | A1* | 7/2015 | Williams | H04L 63/164 713/151 |
| 2016/0124676 | A1 | 5/2016 | Jain et al. | |
| 2016/0124977 | A1 | 5/2016 | Jain et al. | |
| 2017/0060569 | A1* | 3/2017 | Piccinini | G06F 8/656 |
| 2018/0060184 | A1 | 3/2018 | Thakkar et al. | |
| 2019/0384496 | A1 | 12/2019 | Abdul Rasheed et al. | |

OTHER PUBLICATIONS

U.S. Appl. No. 16/456,149, filed Jun. 28, 2019, Envoy for Multi-Tenant Compute Infrastructure.
"U.S. Appl. No. 16/008,972, Notice of Allowance dated Sep. 10, 2018", 18 pgs.
"U.S. Appl. No. 16/456,149, Non Final Office Action dated Jul. 10, 2020", 37 pages.
"U.S. Appl. No. 16/456,149, Advisory Action dated Apr. 12, 2021", 3 pages.
"U.S. Appl. No. 16/456,149, Non Final Office Action dated May 26, 2021", 42 pages.

* cited by examiner

Service Schedule 222

| machine_user_id | machine_id | SLA |
|---|---|---|
| VM01 | m001 | standard VM |
| VM02 | m002 | standard VM |
| PM04 | m003 | standard PM |
| VM07 | m004 | high frequency |
| PM01 | m005 | short life |
| ... | ... | |

FIG. 3A

Job Queue 224

| job_id | start_time | job_type | job_info |
|---|---|---|---|
| 00001 | 0600 | pull snapshot | target = m001 |
| 00002 | 0600 | pull snapshot | target = m005 |
| 00003 | 0610 | replicate | target = m003 |
| 00004 | 0615 | run analytics | target = m002 |
| 00005 | 0615 | trash collection | xxx |
| ... | | | |

FIG. 3B

Snapshot Table 226

| ss_id | ss_time | im_list |
|---|---|---|
| m001.ss1 | 20171001.0300 | m001.im1 |
| m001.ss2 | 20171001.0900 | m001.im1, m001.im1-2 |
| m001.ss3 | 20171001.1500 | m001.im1, m001.im1-2, m001.im2-3 |
| m001.ss4 | 20171001.2100 | m001.im1, m001.im1-2, m001.im2-3, m001.im3-4 |
| m001.ss5 | 20171002.0300 | ... |
| ... | | |

Image Table 228

| im_id | im_location |
|---|---|
| m001.im1 | ... |
| m001.im1-2 | |
| m001.im2-3 | |
| m001.im3-4 | |
| m001.im4-5 | ... |

FIG. 3C

Snapshot Table 226

| ss_id | ss_time | im_list |
|---|---|---|
| m001.ss1 | 20171001.0300 | m001.im1 |
| m001.ss2 | 20171001.0900 | m001.im1, m001.im1-2 |
| m001.ss3 | 20171001.1500 | m001.im1, m001.im1-2, m001.im2-3 |
| m001.ss4 | 20171001.2100 | m001.im1, m001.im1-2, m001.im2-3, m001.im3-4 |
| m001.ss5 | 20171002.0300 | m001.im1, ..., m001.im4-5 |
| m001.ss6 | 20171002.0900 | ... |
| ... | | |
| m001.ss12 | 20171003.2100 | m001.im1, ..., m001.im11-12 |

Image Table 228

| im_id | im_location |
|---|---|
| m001.im1 | ... |
| m001.im1-2 | |
| m001.im2-3 | |
| m001.im3-4 | |
| m001.im4-5 | |
| m001.im5-6 | |
| ... | |
| m001.im11-12 | |

FIG. 4A

Image Table 228

| im_id | im_location |
|---|---|
| m001.im1 | ... |
| m001.im1-2 | |
| m001.im2-3 | |
| m001.im3-4 | |
| m001.im4-5 | |
| m001.im5-6 | |
| ... | |
| m001.im11-12 | |

Snapshot Table 226

| ss_id | ss_time | im_list |
|---|---|---|
| m001.ss1 | 20171001.0300 | m001.im1 |
| m001.ss2 | 20171001.0900 | m001.im1, m001.im1-2 |
| m001.ss3 | 20171001.1500 | m001.im1, m001.im1-2, m001.im2-3 |
| m001.ss4 | 20171001.2100 | m001.im1, m001.im1-2, m001.im2-3, m001.im3-4 |
| m001.ss5 | 20171002.0300 | m001.im1, ..., m001.im4-5 |
| m001.ss6 | 20171002.0900 | ... |
| ... | | |
| m001.ss12 | 20171003.2100 | m001.im1, ..., m001.im11-12 |

FIG. 4B

Snapshot Table 226

| ss_id | ss_time | im_list |
|---|---|---|
| m001.ss1 | 20171001.0300 | m001.im1 |
| m001.ss2 | 20171001.0900 | m001.im1, m001.im1-2 |
| m001.ss3 | 20171001.1500 | m001.im1, m001.im1-2, m001.im2-3 |
| m001.ss4 | 20171001.2100 | m001.im1, m001.im1-2, m001.im2-3, m001.im3-4 |
| m001.ss5 | 20171002.0300 | m001.im5 |
| m001.ss6 | 20171002.0900 | ... |
| ... | | |
| m001.ss12 | 20171003.2100 | m001.im5, ..., m001.im11-12 |

Image Table 228

| im_id | im_location |
|---|---|
| m001.im1 | ... |
| m001.im1-2 | |
| m001.im2-3 | |
| m001.im3-4 | |
| m001.im4-5 | |
| m001.im5-6 | ... |
| ... | |
| m001.im11-12 | |
| m001.im5 | |

FIG. 4C

Snapshot Table 226

| ss_id | ss_time | im_list |
|---|---|---|
| m001.ss1 | 20171001.0300 | m001.im1 |
| m001.ss2 | 20171001.0900 | m001.im1, m001.im1-2 |
| m001.ss3 | 20171001.1500 | m001.im1, m001.im1-2, m001.im2-3 |
| m001.ss4 | 20171001.2100 | m001.im1, m001.im1-2, m001.im2-3, m001.im3-4 |
| m001.ss5 | 20171002.0300 | m001.im5 |
| m001.ss6 | 20171002.0900 | ... |
| ... | | |
| m001.ss12 | 20171003.2100 | m001.im5, ..., m001.im11-12 |

Image Table 228

| im_id | im_location |
|---|---|
| m001.im1 | ... |
| m001.im1-2 | ... |
| m001.im2-3 | ... |
| m001.im3-4 | ... |
| m001.im4-5 | ... |
| m001.im5-6 | ... |
| ... | ... |
| m001.im11-12 | |
| m001.im5 | |
| m001.im5-1 | |

FIG. 4D

ENVOY FOR MULTI-TENANT COMPUTE INFRASTRUCTURE

CROSS REFERENCE TO RELATED APPLICATION

This application is a continuation of U.S. patent application Publication Ser. No. 16/008,972, filed Jun. 14, 2018, which is hereby incorporated by reference in its entirety.

BACKGROUND

1. Technical Field

The present invention generally relates to managing and storing data, for example, for backup purposes in a multi-tenant compute infrastructure.

2. Background Information

The amount and type of data that is collected, analyzed and stored is increasing rapidly over time. The compute infrastructure used to handle this data is also becoming more complex, with more processing power and more portability. As a result, data management and storage is increasingly important. One aspect of this is reliable data backup and storage, and fast data recovery in cases of failure. Another aspect is data portability across locations and platforms.

At the same time, virtualization allows virtual machines to be created and decoupled from the underlying physical hardware. For example, a hypervisor running on a physical host machine or server may be used to create one or more virtual machines that may each run the same or different operating systems, applications and corresponding data. In these cases, management of the compute infrastructure typically includes backup and retrieval of the virtual machines, in addition to just the application data. However, various different platforms are offered for virtualization, including VMware, Microsoft Hyper-V, Microsoft Azure, GCP (Google Cloud Platform), Nutanix AHV, Linux KVM (Kernel-based Virtual Machine), and Xen. While users may desire to have their applications and data be machine-agnostic, it typically is not easy to port applications and data between different platforms. Furthermore, multi-tenant compute infrastructures that host multiple tenants on shared hardware may restrict (e.g., external) access to the virtual machines of each tenant, and the virtual tenant network that connect the virtual machines.

Thus, there is a need for better approaches to managing and storing data, particularly across different virtual machine platforms, and in multi-tenant computing infrastructures.

SUMMARY

A tenant of a multi-tenant compute infrastructure includes an envoy to provide a data management and storage (DMS) cluster of peer DMS nodes with access to virtual machines of the tenant executing on the compute infrastructure for DMS services such as backup, recovery, replication, archival, and analytics services. In some embodiments, a connection is established between the envoy of the tenant and the DMS cluster including peer DMS nodes. The envoy is connected with the virtual machine via a virtual tenant network of the multi-tenant compute infrastructure. The envoy provides the DMS cluster access to the virtual machine via the virtual tenant network. For a backup or "data fetch" job, a snapshot of the virtual machine is generated, such as in response to a request from a peer DMS node. After generating the snapshot, the snapshot is sent from the virtual machine to the peer DMS node via the envoy. The snapshot may be stored in a distributed data store implemented across the peer DMS nodes of the DMS cluster.

In some embodiments, the multi-tenant compute infrastructure restricts access by the DMS cluster to an infrastructure network connecting physical machines including a physical machine that executes the virtual machine. The infrastructure network may include a first transmission control protocol (TCP) network and the virtual tenant network may include a second TCP network isolated from the first TCP network. The infrastructure network and the virtual tenant network may use different network layers and share a physical layer.

In some embodiments, the envoy is a virtual machine of the tenant executing on the multi-tenant compute infrastructure. The envoy may include an edge data store that stores the snapshot of the virtual machine. In some embodiments, the envoy sends the snapshot from the virtual machine to the peer DMS node without storing the snapshot in the edge data store or other local storage of the envoy.

Some embodiments include a multi-tenant compute infrastructure including a virtual machine of a tenant of the compute infrastructure, a virtual tenant network, and an envoy connected to the virtual machine via the virtual tenant network. The envoy establishes a connection with a DMS cluster including peer DMS nodes to provide the DMS cluster access to the virtual machine via the virtual tenant network. The envoy generates a snapshot of the virtual machine, and sends the snapshot from the virtual machine to a peer DMS node via the connection.

Some embodiments include a non-transitory computer-readable medium including instructions that when executed by a processor configures the processor to: establish a connection with a data management and storage (DMS) cluster including peer DMS nodes to provide the DMS cluster access to a virtual machine of a multi-tenant compute infrastructure via the virtual tenant network; generate a snapshot of the virtual machine; and send the snapshot from the virtual machine to a peer DMS node via the connection.

Other aspects include components, devices, systems, improvements, methods, processes, applications, computer readable mediums, and other technologies related to any of the above.

BRIEF DESCRIPTION OF THE DRAWINGS

FIGS. 3A-C are DMS tables that illustrate operation of the system of FIGS. 1-2, according to one embodiment.

FIGS. 4A-4D are DMS tables that illustrate updating of snapshot images, according to one embodiment.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

A tenant of a multi-tenant compute infrastructure includes an envoy to provide a data management and storage (DMS) cluster of peer DMS nodes with access to virtual machines of the tenant. The envoy may be a trusted ambassador appointed by the multi-tenant compute infrastructure owner (e.g. a Managed Service Provider or Cloud Service Provider) to be deployed on tenant's environment. The DMS cluster trusts the envoy, and the envoy is trusted by tenant computers. Thus, the envoy may bridge the gap between the DMS cluster and tenant computers (e.g., virtual machines) via trusted certificates. The trusted certificates may be revoked by the DMS cluster or the tenant.

The DMS cluster provides DMS services such as data fetch, recovery, replication, archival, or analytics services for the tenant using the envoy. The envoy is connected with the virtual machines via a virtual tenant network of the multi-tenant compute infrastructure. The envoy establishes a connection with the DMS cluster, which may be a secure connection. When a snapshot of a virtual machine is generated, the envoy sends the snapshot to a peer DMS node of the DMS cluster. The DMS nodes provide a distributed data store of the DMS cluster. The snapshot is stored in the distributed data store, or some other location accessible to the DMS cluster such as a separate archive system. The compute infrastructure may allocate computing resources of the tenant to the envoy. For example, the envoy may be implemented on a virtual machine of the tenant executing on the multi-tenant compute infrastructure. One or more envoys may be allocated to the tenant based on factors such as the number of virtual machines of the tenant to receive DMS services, the amount of data to be transferred, etc. Among other things, the envoy provides the DMS cluster with secure access to an authorized tenant of the compute infrastructure while maintaining data isolation for other tenants within the compute infrastructure and for shared (e.g., hardware) components of the compute infrastructure across multiple tenants.

Figure 1:
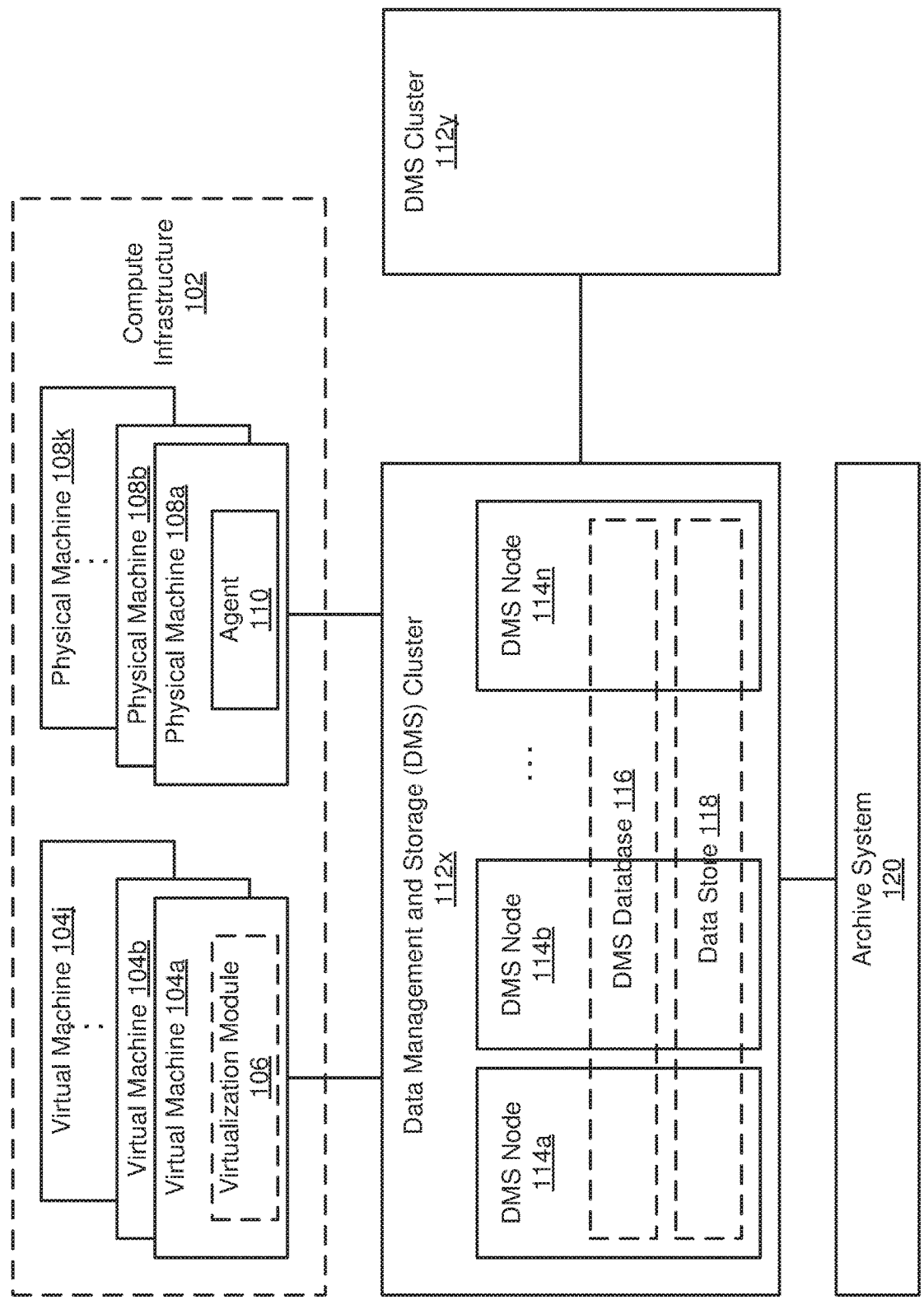
FIG. 1 is a block diagram of a system for managing and storing data, according to one embodiment.

In more detail, FIG. 1 is a block diagram illustrating a system for managing and storing data, according to one embodiment. The system includes a data management and storage (DMS) cluster 112x, a secondary DMS cluster 112y and an archive system 120. The DMS system provides data management and storage services to a compute infrastructure 102, which may be used by multiple tenants. Examples of tenants may include an enterprise such as a corporation, university, or government agency. Many different types of compute infrastructures 102 are possible. Some examples include serving web pages, implementing e-commerce services and marketplaces, and providing compute resources for an enterprise's internal use. The compute infrastructure 102 can include production environments, in addition to development or other environments.

The compute infrastructure 102 includes both virtual machines (VMs) 104a-j and physical machines (PMs) 108a-k. The VMs 104 can be based on different protocols. VMware, Microsoft Hyper-V, Microsoft Azure, GCP (Google Cloud Platform), Nutanix AHV, Linux KVM (Kernel-based Virtual Machine), and Xen are some examples. The physical machines 108a-n can also use different operating systems running various applications. Microsoft Windows running Microsoft SQL or Oracle databases, and Linux running web servers are some examples. In some embodiments, the virtual machines 104 are software simulations of computing systems that execute on one or more of the physical machines 108. Each physical machine 108 may be a host machine that includes a hypervisor that create and executes one or more virtual machines 104 of tenants 122. Additional details regarding a multi-tenant compute infrastructure 102 are discussed below in connection with FIG. 2B.

The DMS cluster 112 manages and stores data for the compute infrastructure 102, such as for one or more tenants of the compute infrastructure. This can include the states of machines 104, 108, configuration settings of machines 104, 108, network configuration of machines 104, 108, and data stored on machines 104, 108. Example DMS services includes backup, recovery, replication, archival, and analytics services. The primary DMS cluster 112x enables recovery of backup data. Derivative workloads (e.g., testing, development, and analytic workloads) may also use the DMS cluster 112x as a primary storage platform to read and/or modify past versions of data.

In this example, to provide redundancy, two DMS clusters 112x-y are used. From time to time, data stored on DMS cluster 112x is replicated to DMS cluster 112y. If DMS cluster 112x fails, the DMS cluster 112y can be used to provide DMS services to the compute infrastructure 102 with minimal interruption.

Archive system 120 archives data for the computer infrastructure 102. The archive system 120 may be a cloud service. The archive system 120 receives data to be archived from the DMS clusters 112. The archived storage typically is "cold storage," meaning that more time can be spent to retrieve data stored in archive system 120. In contrast, the DMS clusters 112 provide faster data retrieval, such as for backup recovery.

The following examples illustrate operation of the DMS cluster 112 for backup and recovery of VMs 104. This is used as an example to facilitate the description. The same principles apply also to PMs 108 and to other DMS services.

Each DMS cluster 112 includes multiple peer DMS nodes 114a-n that operate autonomously to collectively provide the DMS services, including managing and storing data. A DMS node 114 includes a software stack, processor and data storage. DMS nodes 114 can be implemented as physical machines and/or as virtual machines, and in some embodiments, may be implemented in the compute infrastructure 102 or some other compute infrastructure. The DMS nodes 114 are interconnected with each other, for example, via cable, fiber, backplane, and/or network switch. In some embodiments, the end user does not interact separately with each DMS node 114, but interacts with the DMS nodes 114a-n collectively as one entity, namely, the DMS cluster 112. For example, the DMS nodes 114 may be peer DMS nodes each having the capability to perform DMS services, either individually or by working with other DMS nodes 114.

The DMS nodes 114 are peers and preferably each DMS node 114 includes common functionality. The DMS cluster 112 automatically configures the DMS nodes 114 as new nodes are added to the DMS cluster 112 or existing nodes are dropped or fail. For example, the DMS cluster 112 automatically discovers new nodes, or otherwise may control the allocation of DMS nodes 114 to the DMS cluster 112. In this way, the computing power and storage capacity of the DMS cluster 112 is scalable by adding more nodes 114.

The DMS cluster 112 includes a DMS database 116 and a data store 118. The DMS database 116 stores data structures used in providing the DMS services, as will be described in more detail in FIG. 2A. In the following examples, these are shown as tables but other data structures could also be used. The data store 118 contains the backup data from the compute infrastructure 102, for example snapshots of VMs or application files. Both the DMS database 116 and the data store 118 are distributed across the nodes 114, for example using Apache Cassandra. That is, the DMS database 116 in its entirety is not stored at any one DMS node 114. Rather, each DMS node 114 stores a portion of the DMS database 116 but can access the entire DMS database. Data in the DMS database 116 preferably is replicated over multiple DMS nodes 114 to increase the fault tolerance and throughput, to optimize resource allocation, and/or to reduce response time. In one approach, each piece of data is stored on at least three different DMS nodes. The data store 118 has a similar structure, although data in the data store may or may not be stored redundantly. Accordingly, if any DMS node 114 fails, the full DMS database 116 and the full functionality of the DMS cluster 112 will still be available from the remaining DMS nodes. As a result, the DMS services can still be provided.

Considering each of the other components shown in FIG. 1, a virtual machine (VM) 104 is a software simulation of a computing system. The virtual machines 104 each provide a virtualized infrastructure that allows execution of operating systems as well as software applications such as a database application or a web server. A virtualization module 106 resides on a physical host (i.e., a physical computing system) (not shown), and creates and manages the virtual machines 104. The virtualization module 106 facilitates backups of virtual machines along with other virtual machine related tasks, such as cloning virtual machines, creating new virtual machines, monitoring the state of virtual machines, and moving virtual machines between physical hosts for load balancing purposes. In addition, the virtualization module 106 provides an interface for other computing devices to interface with the virtualized infrastructure. In the following example, the virtualization module 106 is assumed to have the capability to take snapshots of the VMs 104. An agent could also be installed to facilitate DMS services for the virtual machines 104.

A physical machine 108 is a physical computing system that allows execution of operating systems as well as software applications such as a database application or a web server. In the following example, an agent 110 is installed on the physical machines 108 to facilitate DMS services for the physical machines.

The components shown in FIG. 1 also include storage devices, which for example can be a hard disk drive (HDD), a magnetic tape drive, a solid-state drive (SSD), or a disk array (e.g., a storage area network (SAN) storage device, or a networked-attached storage (NAS) device). A storage device can be separate from or integrated with a physical machine.

The components in FIG. 1 are interconnected with each other via networks, although many different types of networks could be used. In some cases, the relevant network uses standard communications technologies and/or protocols and can include the Internet, local area networks, and other types of private or public networks. The components can also be connected using custom and/or dedicated data communications technologies.

Figure 2A:
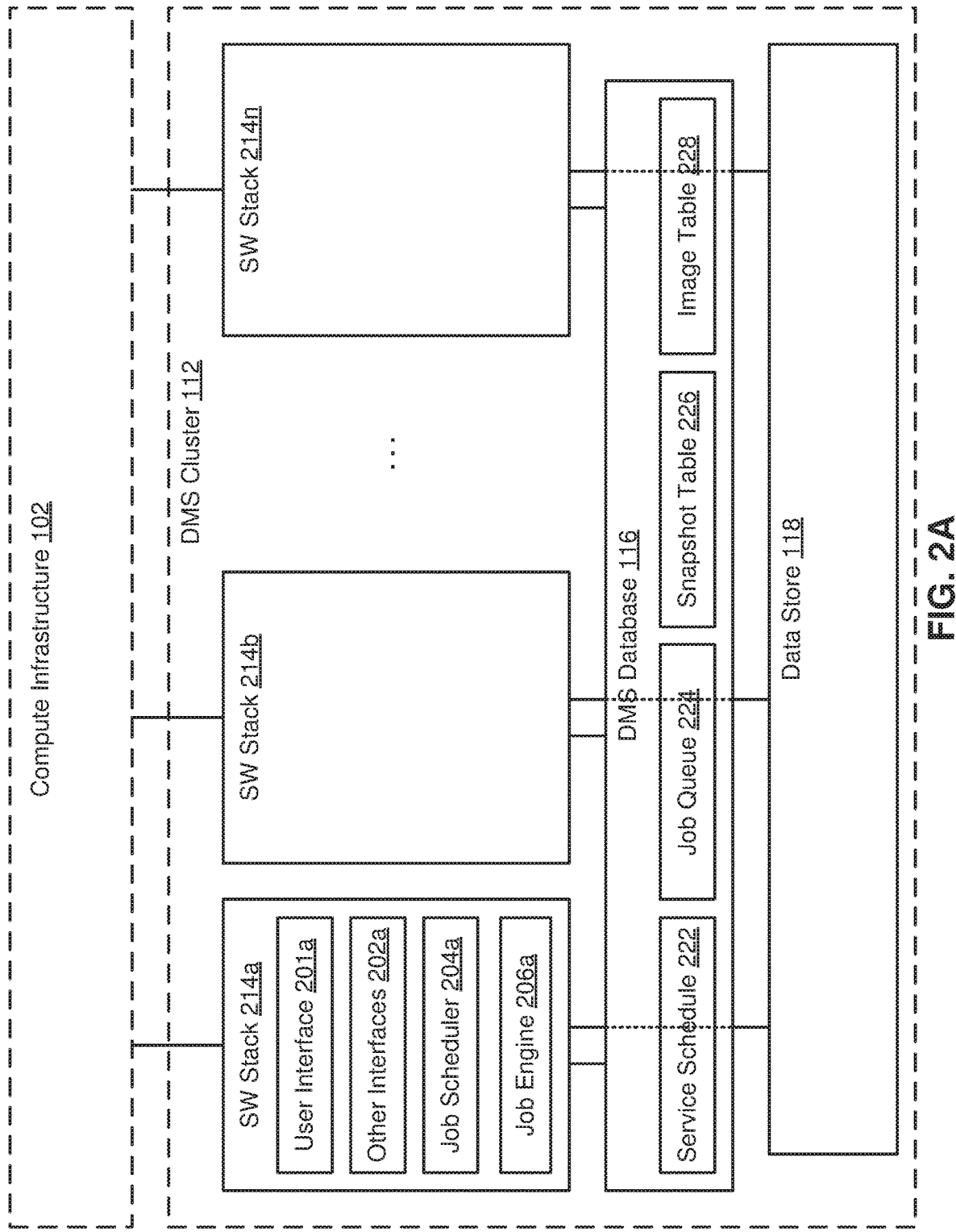
FIG. 2A is a logical block diagram of a data management and storage (DMS) cluster, according to one embodiment.

FIG. 2A is a logical block diagram illustrating an example DMS cluster 112, according to one embodiment. This logical view shows the software stack 214a-n for each of the DMS nodes 114a-n of FIG. 1. Also shown are the DMS database 116 and data store 118, which are distributed across the DMS nodes 114a-n. Preferably, the software stack 214 for each DMS node 114 is the same. This stack 214a is shown only for node 114a in FIG. 2. The stack 214a includes a user interface 201a, other interfaces 202a, job scheduler 204a and job engine 206a. This stack is replicated on each of the software stacks 214b-n for the other DMS nodes. The DMS database 116 includes the following data structures: a service schedule 222, a job queue 224, a snapshot table 226 and an image table 228. In the following examples, these are shown as tables but other data structures could also be used.

The user interface 201 allows users to interact with the DMS cluster 112. Preferably, each of the DMS nodes includes a user interface 201, and any of the user interfaces can be used to access the DMS cluster 112. This way, if one DMS node fails, any of the other nodes can still provide a user interface. The user interface 201 can be used to define what services should be performed at what time for which machines in the compute infrastructure (e.g., the frequency of backup for each machine in the compute infrastructure). In FIG. 2, this information is stored in the service schedule 222. The user interface 201 can also be used to allow the user to run diagnostics, generate reports or calculate analytics.

The software stack 214 also includes other interfaces 202. For example, there is an interface 202 to the computer infrastructure 102, through which the DMS nodes 114 may make requests to the virtualization module 106 and/or the agent 110. In one implementation, the VM 104 can communicate with a DMS node 114 using a distributed file system protocol (e.g., Network File System (NFS) Version 3) via the virtualization module 106. The distributed file system protocol allows the VM 104 to access, read, write, or modify files stored on the DMS node 114 as if the files were locally stored on the physical machine supporting the VM 104. The distributed file system protocol also allows the VM 104 to mount a directory or a portion of a file system located within the DMS node 114. There are also interfaces to the DMS database 116 and the data store 118, as well as network interfaces such as to the secondary DMS cluster 112y and to the archive system 120.

The job schedulers 204 create jobs to be processed by the job engines 206. These jobs are posted to the job queue 224. Examples of jobs are pull snapshot (take a snapshot of a machine), replicate (to the secondary DMS cluster), archive, etc. Some of these jobs are determined according to the service schedule 222. For example, if a certain machine is to be backed up every 6 hours, then a job scheduler will post a "pull snapshot" job into the job queue 224 at the appropriate 6-hour intervals. Other jobs, such as internal trash collection or updating of incremental backups, are generated according to the DMS cluster's operation separate from the service schedule 222.

The job schedulers 204 preferably are decentralized and execute without a master. The overall job scheduling function for the DMS cluster 112 is executed by the multiple job schedulers 204 running on different DMS nodes. Preferably, each job scheduler 204 can contribute to the overall job queue 224 and no one job scheduler 204 is responsible for the entire queue. The job schedulers 204 may include a fault tolerant capability, in which jobs affected by node failures are recovered and rescheduled for re-execution.

The job engines 206 process the jobs in the job queue 224. When a DMS node is ready for a new job, it pulls a job from the job queue 224, which is then executed by the job engine 206. Preferably, the job engines 206 all have access to the entire job queue 224 and operate autonomously. Thus, a job scheduler 204j from one node might post a job, which is then pulled from the queue and executed by a job engine 206k from a different node.

In some cases, a specific job is assigned to or has preference for a particular DMS node (or group of nodes) to execute. For example, if a snapshot for a VM is stored in the section of the data store 118 implemented on a particular node 114x, then it may be advantageous for the job engine 206x on that node to pull the next snapshot of the VM if that process includes comparing the two snapshots. As another example, if the previous snapshot is stored redundantly on three different nodes, then the preference may be for any of those three nodes.

The snapshot table 226 and image table 228 are data structures that index the snapshots captured by the DMS cluster 112. In this example, snapshots are decomposed into images, which are stored in the data store 118. The snapshot table 226 describes which images make up each snapshot. For example, the snapshot of machine x taken at time y can be constructed from the images a,b,c. The image table is an index of images to their location in the data store 118. For example, image a is stored at location aaa of the data store 118, image b is stored at location bbb, etc. More details of example implementations are provided in FIGS. 3 and 4 below.

DMS database 116 also stores metadata information for the data in the data store 118. The metadata information may include file names, file sizes, permissions for files, and various times such as when the file was created or last modified.

Figure 2B:
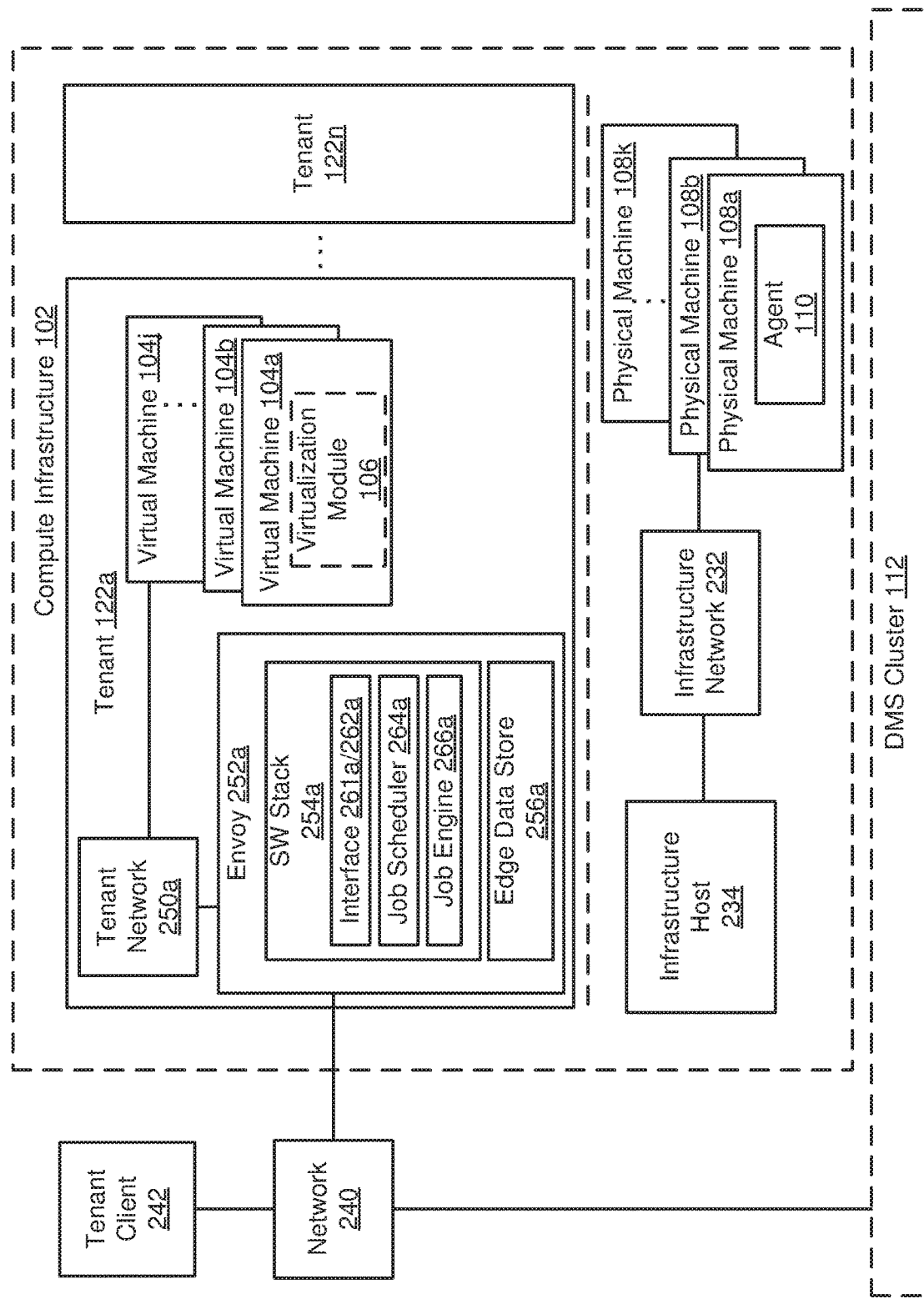
FIG. 2B is a logical block diagram of a compute infrastructure, according to one embodiment.

FIG. 2B is a logical block diagram illustrating an example compute infrastructure 102, according to one embodiment. The compute infrastructure 102 is an example of a multi-tenant compute infrastructure that provides computing resources to multiple tenants 122. In one example, a cloud service provider manages the compute infrastructure 102, and provides services to the tenants. The compute infrastructure 102 isolates data of different tenants from each other, such as by using separate tenant networks 250 for each tenant 122. Similarly, the data of the tenant 122a is isolated from other machines that do not belong to the tenant 122a, such as the DMS cluster 112. The DMS cluster 112 may be operated by a separate provider of DMS services which does not have access to tenant data via the cloud service provider. As such, a tenant 122a provides the DMS cluster 112 access to the virtual machines 104 via envoy 252a. The DMS cluster 112 may be separate from the compute infrastructure 102, or may be in the compute infrastructure 102 (e.g., a separate tenant).

The compute infrastructure 102 include hardware components and software components that execute on the hardware components. The hardware components include physical machines 108 connected with an infrastructure host 234 via an infrastructure network 232. The hardware components of the compute infrastructure 102 may be located in a data center, or distributed across multiple data centers. The hardware components provide processing, data storage, and networking services for the tenants 122 by executing the software components of the tenants 122. In particular, hypervisors running on physical host machines may be used to create one or more virtual machines 104 for multiple tenants 122.

The compute infrastructure 102 is connected with the DMS cluster 112 and a tenant client 242 via a network 240. The network 240 is external to the tenant networks 250 and the infrastructure network 232 of the compute infrastructure 102, and may include the Internet, local area networks, and other types of private or public networks. The tenant client 242 is an example of a computing device that a user may use to access the compute infrastructure 102 via the network 240. For example, the tenant client 242 may access the compute infrastructure 102, such as via an infrastructure host 234 or other machine of the compute infrastructure 102, to configure the virtual machines 104 to execute applications that provide webpages, online services, etc. on behalf of the tenant. The tenant client 242 may also define DMS services for the tenant 122a by communicating with the DMS cluster 112 via the network 240.

The infrastructure host 234 may manage (e.g., computing and storage) resources of the physical machines 108 for sharing by the virtual machines 104. For example, the infrastructure host 234 may manage assignments of virtual machines 104 to the physical machines 108 and the resources allocation of the physical machines 108 to each virtual machine 104. The infrastructure host 234 may further provide management services for the tenant client 242, such as tenant login and account management, virtual machine configuration, network configuration, etc. The infrastructure network 232 refers to a network which connects the physical machines 108 with each other, as well as the network 240. The infrastructure network 232 may include networking components such as switches, routers, load balancers, etc. The physical machines 108 may include processing and storage hardware components, and may execute software simulations to provide the virtual machines 104 for multiple tenants 122.

Multiple tenants 122, including for example tenants 122a through 122n, may be deployed in the compute infrastructure 102. The compute infrastructure 102 is a multi-tenant compute infrastructure that isolates the machines, networks, and data of different tenants 122. The tenant 122a includes the virtual machines 104, a tenant network 250a, and an envoy 252a that is connected with the virtual machines 104 via the tenant network 250a. Other tenants 122 of the compute infrastructure 102 may include the same or similar components as shown for the tenant 122a. For example, each tenant 122 may connect with a DMS cluster 114 via an envoy 252.

The infrastructure network 232 is isolated from the tenant networks 250 of the tenants 122 such that access to one tenant network 250a of a tenant 122 does not result in access to the infrastructure network 232, the physical machines 108, or the virtual machines 104 and tenant networks 250 of other tenants 122. For example, each of the tenant networks 250 of different tenants 122 and the infrastructure network 232 may use different, isolated transmission control protocol (TCP) networks (e.g., as defined in the network layer (Layer 3) or transport layer (Layer 4) of the Open Systems Interconnection (OSI) model), while sharing the same physical infrastructure (e.g., as defined in the physical layer (Layer 1) and data link layer (Layer 2) of the OSI model). Furthermore, tenant networks 250 of different tenants 122 may use the same or similar internet protocol (IP) address ranges.

The envoy 252a provides a connection between the DMS cluster 112 and the tenant 122a for providing DMS services to the tenant 122a. The envoy 252a may include a secure socket layer (SSL) certificate that is signed by a DMS node 114 of the DMS cluster 112 such that the envoy 252a is trusted by the DMS cluster 112 as a data mover. In some embodiments, the envoy 252a may include an SSL certificate that is signed by the tenant 122a. The SSL certificates may be used by the envoy 252a to provide a connection between the tenant 122a and the DMS cluster 122. In some embodiments, the SSL certificates can be terminated by the DMS Cluster 122 or the tenant 122a, resulting in termination of the connection provided by the envoy 252a.

In some embodiments, the envoy 252a routes data between the tenant network 250a and the DMS cluster 112 for the purposes of streaming and replicating snapshots. In some embodiments, the envoy 252a may also be used to access the DMS cluster 112 to manage stored snapshots in the DMS data store 118 of the DMS cluster 112x, replication snapshots stored in the DMS cluster 112y, or archival snapshots stored in the archive system 120.

In some embodiments, the envoy 252a may be a DMS node 114, or include some or all of the components of the DMS node 114. An envoy 252a may also function as a peer DMS node 114 with other DMS nodes of the DMS cluster 112. For example, the envoy 252a may include a software stack 254a and an edge data store 256a. The software stack 254a includes interfaces 261a/262a, a job scheduler 264a, and a job engine 266a. The discussion above regarding the components of the software stack 214 of the DMS node 114 may be applicable to corresponding components of the software stack 254a. For example, the interfaces 261a/262a allows users to interact with the envoy 252a and the DMS cluster 112, such as to define what services should be performed at what time for which machines in the compute infrastructure, run diagnostics, generate reports, or calculate analytics. The interface 262a may be used to make requests to the virtualization modules 106 of the virtual machines 104 of the tenant 122a to generate snapshots, among other things.

The job scheduler 264a create jobs to be processed by the job engines 206 of DMS nodes 114, or by the job engine 266 of an envoy 252. The job scheduler 264a may place jobs in the job queue 224 based on the service schedule 222. In some embodiments, the software stack 254a is omitted from the envoy 252a. Rather than performing functionality of a DMS node 114, the envoy 252a may act as an intermediary for secure communications between a DMS node 114 and the virtualization modules 106 of the virtual machines 104.

The job engine 266a generates snapshots of the virtual machines 104 of the tenant 122a, and provides the snapshots and any related data to the DMS cluster 112 for storage (e.g., in the data store 118, snapshot table 225, and image table 228). The job engine 266a may monitor the job queue 224 to retrieve and execute jobs. To that end, the job engine 266a may communicate with the virtualization modules 106 of the virtual machines 104 via the tenant network 250a.

The edge data storage 256 stores snapshots or images of the virtual machines 104 of the tenant 122a. The edge data storage 256 may be a local cache of the envoy 252 used to facilitate data transfer of stored snapshots to the DMS cluster 112. In some embodiments, generated snapshots of virtual machines 104 are transmitted directly to the DMS cluster 112, bypassing the edge data storage 256. Here, the edge data storage 256 may be omitted from the envoy 252a.

In some embodiments, the edge data store 256a provides a portion of the distributed DMS database 116 and data store 118, which are distributed across the DMS nodes 114a-n and one or more envoys 252.

In some embodiments, the compute infrastructure 102 provides one or more virtual disk transport modes for image level backups of the virtual machines 104. Some examples of transport modes include local file access, SAN transport, hot-add transport, network block device (NBD) transport, and secure NBD transport (NBDSSL). In some embodiments, the envoy 252a may use the hot-add transport mode, where the envoy 252a is implemented using a virtual machine 104 of the compute infrastructure 102. In other embodiments, the envoy 252a may use the NBD or NBDSSL transport mode, where the envoy 252a is implemented using a separate physical device connected to the infrastructure network 232. However, the hot-add transport mode may be used when the compute infrastructure 102 includes multiple tenants because direct access to the infrastructure network 232 may be restricted for the tenants 122, such as to preserve data privacy among tenants 122. Thus, the envoy 252a can preferably use the hot-add transport mode to facilitate DMS services by the DMS Cluster 112 without requiring the DMS cluster 112 being granted direct access to the infrastructure network 232, or connected hardware components such as the infrastructure host 234 and physical machines 108.

The tenant network 250a is a virtual network of the tenant 122a. The tenant network 250a connects the virtual machines 104 and the envoy 252a of the tenant 122a to each other. The tenant network 250a may include virtual switches, virtual bridges, virtual adapters, virtual network address translation (NAT) devices, virtual dynamic host configuration protocol (DHCP) servers, virtual network adapters, among other components. The envoy 252a provides access for the DMS cluster 112 to the tenant network 250a and the virtual machines 104 of the tenant 102a.

FIGS. 3 and 4 illustrate operation of the DMS system shown in FIGS. 1-2. FIG. 3A is an example of a service schedule 222. The service schedule defines which services should be performed on what machines at what time. It can be set up by the user via the user interface, automatically generated, or even populated through a discovery process. In this example, each row of the service schedule 222 defines the services for a particular machine. The machine is identified by machine_user_id, which is the ID of the machine in the compute infrastructure. It points to the location of the machine in the user space, so that the envoy or DMS cluster can find the machine in the compute infrastructure. In this example, there is a mix of virtual machines (VMxx) and physical machines (PMxx). The machines are also identified by machine_id, which is a unique ID used internally by the DMS cluster.

The services to be performed are defined in the SLA (service level agreement) column. Here, the different SLAs are identified by text: standard VM is standard service for virtual machines. Each SLA includes a set of DMS policies (e.g., a backup policy, a replication policy, or an archival policy) that define the services for that SLA. For example, "standard VM" might include the following policies:

Backup policy: The following backups must be available on the primary DMS cluster 112x: every 6 hours for the prior 2 days, every 1 day for the prior 30 days, every 1 month for the prior 12 months.

Replication policy: The backups on the primary DMS cluster for the prior 7 days must also be replicated on the secondary DMS cluster 112y.

Archive policy: Backups that are more than 30 days old may be moved to the archive system 120.

The underlines indicate quantities that are most likely to vary in defining different levels of service. For example, "high frequency" service may include more frequent backups than standard. For "short life" service, backups are not kept for as long as standard.

From the service schedule 222, the job schedulers 204 populate the job queue 224. FIG. 3B is an example of a job queue 224. Each row is a separate job. job_id identifies a job and start_time is the scheduled start time for the job. job_type defines the job to be performed and job_info includes additional information for the job. Job 00001 is a job to "pull snapshot" (i.e., take backup) of machine m001. Job 00003 is a job to replicate the backup for machine m003 to the secondary DMS cluster. Job 00004 runs analytics on the backup for machine m002. Job 00005 is an internal trash collection job. The jobs in queue 224 are accessible by any of the job engines 206, although some may be assigned or preferred to specific DMS nodes.

FIG. 3C are examples of a snapshot table 226 and image table 228, illustrating a series of backups for a machine m001. Each row of the snapshot table is a different snapshot and each row of the image table is a different image. The snapshot is whatever is being backed up at that point in time. In the nomenclature of FIG. 3C, m001.ss1 is a snapshot of machine m001 taken at time t1. In the suffix ".ss1", the .ss indicates this is a snapshot and the 1 indicates the time t1. m001.ss2 is a snapshot of machine m001 taken at time t2, and so on. Images are what is saved in the data store 118. For example, the snapshot m001.ss2 taken at time t2 may not be saved as a full backup. Rather, it may be composed of a full backup of snapshot m001.ss1 taken at time t1 plus the incremental difference between the snapshots at times t1 and t2. The full backup of snapshot m001.ss1 is denoted as m001.im1, where ".im" indicates this is an image and "1" indicates this is a full image of the snapshot at time t1. The incremental difference is m001.im1-2 where "1-2" indicates this is an incremental image of the difference between snapshot m001.ss1 and snapshot m001.ss2.

In this example, the service schedule indicates that machine m001 should be backed up once every 6 hours. These backups occur at 3 am, 9 am, 3 pm and 9 pm of each day. The first backup occurs on Oct. 1, 2017 at 3 am (time t1) and creates the top rows in the snapshot table 226 and image table 228. In the snapshot table 226, the ss_id is the snapshot ID which is m001.ss1. The ss_time is a timestamp of the snapshot, which is Oct. 1, 2017 at 3 am. im_list is the list of images used to compose the snapshot. Because this is the first snapshot taken, a full image of the snapshot is saved (m001.im1). The image table 228 shows where this image is saved in the data store 118.

On Oct. 1, 2017 at 9 am (time t2), a second backup of machine m001 is made. This results in the second row of the snapshot table for snapshot m001_ss2. The image list of this snapshot is m001.im1 and m001.im1-2. That is, the snapshot m001_ss2 is composed of the base full image m001.im1 combined with the incremental image m001.im1-2. The new incremental image m001.im1-2 is stored in data store 118, with a corresponding entry in the image table 228. This process continues every 6 hours as additional snapshots are made.

For virtual machines, pulling a snapshot for the VM typically includes the following steps: freezing the VM and taking a snapshot of the VM, transferring the snapshot (or the incremental differences) and releasing the VM. For example, the DMS cluster may receive a virtual disk file that includes the snapshot of the VM. The backup process may also include deduplication, compression/decompression and/or encryption/decryption.

From time to time, these tables and the corresponding data are updated as various snapshots and images are no longer needed or can be consolidated. FIGS. 4A-4D show an example of this. FIG. 4A shows the snapshot table and image table after backups have been taken for 3 days using the process described in FIG. 3. However, if the service schedule requires 6-hour backups only for the past 2 days, then the 6-hour backups for the first day October 1 are no longer needed. The snapshot m001.ss1 is still needed because the service schedule requires daily backups, but snapshots .ss2, .ss3 and .ss4 can be deleted and are removed from the snapshot table, as indicated by the cross-hatching in FIG. 4B. However, the incremental images .im1-2, .im2-3 and .im3-4 are still required to build the remaining snapshots.

In FIG. 4C, the base image is updated from .im1 to .im5. That is, a full image of snapshot 5 is created from the existing images. This is a new row at the bottom of the image table 228. The im_list for snapshots .ss5 to .ss12 are also updated to stem from this new base image .im5. As a result, the incremental images .im1-2, .im2-3, .im3-4 and .im4-5 are no longer required and they can be deleted from the data store and from the image table 228. However, the data store now contains two full images: .im1 and .im5. Full images are usually much larger than incremental images. This redundancy can be addressed by creating a backwards incremental image .im5-1, shown in FIG. 4D as a new row in the image table 228. With the addition of this backwards incremental image, the full image .im1 is no longer needed.

Figure 5:
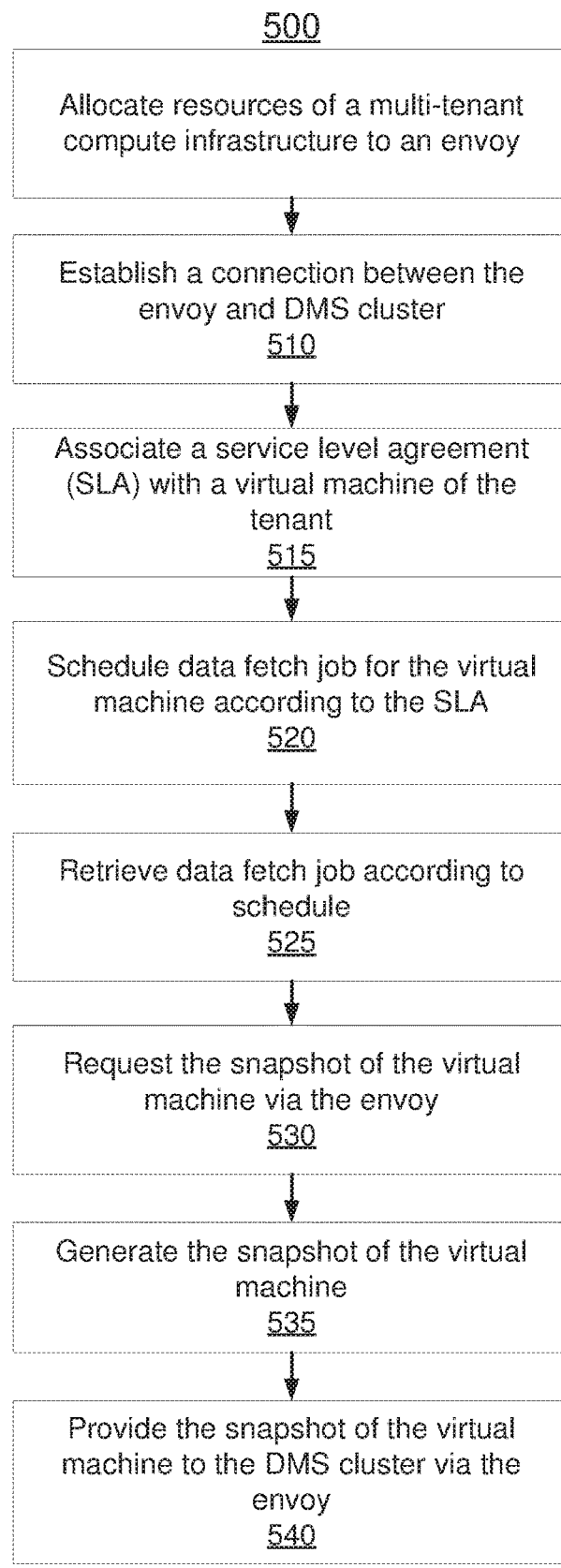
FIG. 5 is a flow chart of a process for generating a snapshot of a virtual machine, according to one embodiment.

FIG. 5 is a flow chart of a process 500 for generating a snapshot of a virtual machine in a multi-tenant compute infrastructure, according to one embodiment. The process 500 is discussed as being performed by the compute infrastructure 102 and the DMS cluster 112, although other types of computing structures may be used. In some embodiments, the process 500 may include different and/or additional steps, or some steps may be in different orders.

The compute infrastructure 102 (e.g., infrastructure host 234) allocates 505 resources of a multi-tenant compute infrastructure 102 to an envoy 252. For example, an envoy 252a for the tenant 122a may be a virtual appliance implemented using the compute resource pool of the tenant 122a in the compute infrastructure 102. The envoy 252 may use a hot-add transport mode of the compute infrastructure 102 where the envoy 252 is implemented using a virtual machine 104. The envoy 242 has access to the tenant network 250a, and other virtual machines 104 of the tenant 122a via the tenant network 250a. In some embodiments, an envoy 252 may be allocated to the tenant 122 while virtual machines 104 are executing using the hot-add transport mode.

A tenant 122a may be allocated a single envoy 252, or multiple envoys 252 to scale-out performance. Each envoy 252 may include a particular amount of processing or storage resources, and the number of envoys 252 allocated to the tenant may be selected such that there is sufficient resources for performing DMS services for the tenant.

In some embodiments, the envoy 252a includes processing resources including the software stack 254a. The envoy 252a may include some or all of the processing resources of a DMS node 114 of the DMS cluster 112, and perform functionalities of a peer DMS node 114 such as scheduling and processing jobs for the DMS cluster 112. For a data fetch job, the processing resources of the envoy 252 may be used to facilitate the creation of a snapshot of a virtual machine 104. The snapshots may be captured by the envoy 252 (e.g., the job engine 266a) using the hot-add transport mode, and transferred to the DMS cluster 112 for storage within the data store 118. In another example, a DMS node 114 of the DMS cluster captures the snapshots of virtual machines using the envoy 252a as router that provides access to the tenant network 250a and the connected virtual machines 104 of the tenant 122a.

In some embodiments, a DMS cluster 122 may further allocate resources of the DMS nodes 114 to provide DMS services on behalf of the tenant 122a. For example, the DMS cluster 112 may define or update the size of the DMS cluster 112 by associating multiple DMS nodes 114 as needed to perform DMS services for the tenant. For example, each DMS node 114 may include a particular amount of compute (e.g., storage, processing, etc.) resources, and thus more DMS nodes 114 may be associated with the DMS cluster 112 as needed for performing DMS services for the tenant. The amount of resources allocated may vary, for example, based on the number of machines of the tenant, the amount of data to be transferred, or the amount of DMS nodes 114 authorized for the tenant.

The DMS cluster 112 establishes 510 a connection with an envoy 252 of the tenant 122 of the compute infrastructure 102. The envoy 252 may facilitate data transfer between the tenant 122a and the DMS cluster 112 via the external network 240. For example, the envoy 252a of the tenant 122a may include a secure socket layer (SSL) certificate that is signed by the DMS cluster 112, and thus the envoy 252a is trusted by the DMS cluster 112 as a data mover. After the connection is established, such as by an SSL handshake, the DMS nodes 114 of the DMS cluster 112 may access the envoy 252a. Furthermore, data transferred between the DMS cluster 112 and the envoy 252a may be secured after verification through the SSL handshake. Other types of security in addition or alternative to SSL certificates may be used to secure the connection. In some embodiments, the envoy 252a further includes an SSL certificate signed by the tenant 122 of the compute infrastructure, and thus is trusted by the tenant 122.

In some embodiments, the connection of the envoy 252a with the DMS cluster 112 results in the envoy 252a being allocated as a peer DMS node of the DMS cluster 112. Here, the envoy 252a may perform some or all of the functionalities discussed herein for the peer DMS nodes 114.

The DMS cluster 112 (e.g., a job scheduler 204 of a DMS node 114) associates 515 a SLA with a virtual machine 104 of the tenant 122. The SLA may define the DMS service(s) to be performed for the virtual machine 104. The job scheduler 204a may store the SLA in association with the virtual machine within a row of the service schedule 222. The service schedule 222 may be stored in the DMS database 116 of the DMS cluster 112, or some other database that is accessible to the DMS nodes 114 of the DMS cluster 112.

In some embodiments, the envoy 252a includes the job scheduler 264a that associates the SLA with the virtual machine. The tenant client 242 may access the envoy 252a to select the virtual machine 104, and define the SLA of the virtual machine 104. The job scheduler 264a may store the association within the service schedule 222 of the DMS cluster 112.

The DMS cluster 112 (e.g., the job scheduler 204) schedules 520 a data fetch job for the virtual machine 104 according to the SLA. For example, the job scheduler 204a populates the job queue 224 with data fetch jobs according to the service schedule 222. Each fetch job for a machine may be a separate row in the job queue 224. Each job may be identified by the job_id, and may be associated with a start_time defining the scheduled start time for the job. The type of job may be defined by job_type, which for a data fetch job may be specified as "pull snapshot." Additional information regarding each job may be defined by job_info, such as the machine_id or machine_user_id of the machine. In some embodiments, the envoy 252a includes the job scheduler 264a schedules the data fetch job for the virtual machine 104 according to the SLA.

The DMS cluster 112 (e.g., the job engine 206 of a DMS node 114 of the DMS cluster 112) retrieves 525 the data fetch job according to the schedule. For example, the job engine 206 of multiple DMS nodes 114 may monitor the jobs queue 224, and retrieve jobs from the job queue for execution according to defined start times. In some embodiments, each job engine 206 may retrieve one of the jobs defined in a row of the job queue. In some embodiments, the job engine 266a of the envoy 252a retrieves the data fetch job. As discussed above, the envoy 252a may include the software stack of a DMS node 114 including the job engine 266a.

The DMS cluster 112 (e.g., the job engine 206 of a DMS node 114) requests 530 a snapshot of the virtual machine 104 from a virtual machine via the envoy 252a. For example, the job engine 206 sends a request to pull the snapshot of the virtual machine 104 to the virtualization module 106 of the virtual machine 104 via the connection through the external network 240 and the envoy 252a. The request may include, for example, the machine_user_id which defines the ID of the machine in the compute infrastructure 102 selected for the data fetch job. The request, as well as other communications between the DMS cluster 112 and the envoy 252a may be encrypted, such as by using a public and private keys associated with the SSL certificate.

The virtual machine 104 generates 535 the snapshot of the virtual machine 104. For example, in response to the request from the DMS cluster 112 received via the envoy 252a, the virtualization module 106 generates the snapshot of the virtual machine 104 by capturing data from virtual machine 104. The snapshot of the virtual machine 104 may be a full snapshot, or an incremental snapshot. The virtualization module 106 may freeze the machine, takes the snapshot of the machine, transfers the snapshot (or the incremental differences), and releases the machine.

In some embodiments, the job engine 266a of the envoy 252a monitors the job queue 224 like a DMS node 114, retrieves the data fetch job from the job queue 224, and requests the snapshot of the virtual machine 104 via the virtualization module 106. Furthermore, the tenant 122a may include multiple envoys 252a that each processes jobs from the job queue 224 associated with the tenant 122a. When the envoy 252a retrieves a job from the job queue 224, the envoy 252a may directly process the job, and no request is needed from the DMS cluster 112.

The envoy 252 provides 540 the snapshot of the virtual machine 104 to the DMS cluster 112 for storage. For example, the envoy 252a may receive the snapshot from the virtualization module 106 of the virtual machine 104 via the tenant network 250a, and transmit the snapshot to one or more DMS nodes 114 of the DMS cluster 112 via the external network 240. As such, the DMS cluster 112 receives the snapshot of the virtual machine 104 without requiring direct access to the infrastructure network 232 of the compute infrastructure 102. The DMS cluster 112 may store the snapshot in the data store 118. The snapshot table 226 and image table 228 may be updated to associate the snapshot with one or more images. In some embodiments, the envoy 252 may store the snapshot in the edge data store 256a. The edge data store 256a may be a temporary storage used to facilitate transfer of the snapshot to the DMS cluster 112, or may be a more permanent storage. In some embodiments, the edge data store 256a may be a virtual disk that is allocated from computing resources of the compute infrastructure 102 using the hot-add transport mode. In some embodiments, the envoy 252 acts as a router for the snapshot between the virtual machine 104 and the DMS cluster 112. Here, the envoy 252a may stream the snapshot to the DMS cluster 112 without storing the snapshot in a local storage (e.g., edge data store 256a) of the envoy 252a. The edge data store 256a, if bypassed, may be omitted from the envoy 252. In some embodiments, the snapshot transmitted between the DMS cluster 112 and the envoy 252a may be encrypted by the envoy 252a for transmission, and then decrypted by the DMS cluster 112 after transmission.

Although the process 500 is discussed with respect to data fetch jobs, other types of jobs may be performed using the process 500. As discussed above, the DMS cluster 112 and envoy 252 are not limited to providing backup or data fetch jobs, and may also provide other DMS services including recovery, replication, trash collection, archival, and analytics services. Furthermore, the process 500 may be repeated to generate multiple snapshots of the virtual machines of the tenant 122a. Jobs for each snapshot may be placed in the jobs queue 224 and retrieved by job engines of the DMS nodes and/or envoys to execute the jobs. The DMS nodes 114 and envoys 252 of a tenant 122a may be "peers," and the DMS services for particular machines may be processed by different DMS nodes 114 of the DMS cluster 112 and/or envoys 252 as they are retrieved from the jobs queue 224. In some embodiments, envoys may include similar components as a DMS node 114 such as the software stack 254 including the interface(s) 261a/262a, job scheduler 264a, and job engine 266a. Thus, some or all of the functionality discussed herein as being performed by the envoy 252 may also be performed by a DMS node 114, and similarly, some or all of the functions discussed herein as being performed by a DMS node 114 may also be performed by the envoy 252. In some embodiments, components of the software stack 214 in the DMS nodes 114 may be omitted when similar components are located in the envoy 252. For example, the DMS nodes 114 of the DMS cluster 112 may include the DMS database 116 and the datastore 118 to store snapshots of virtual machines generated by the software stack 254 of the envoy 252.

Figure 6:
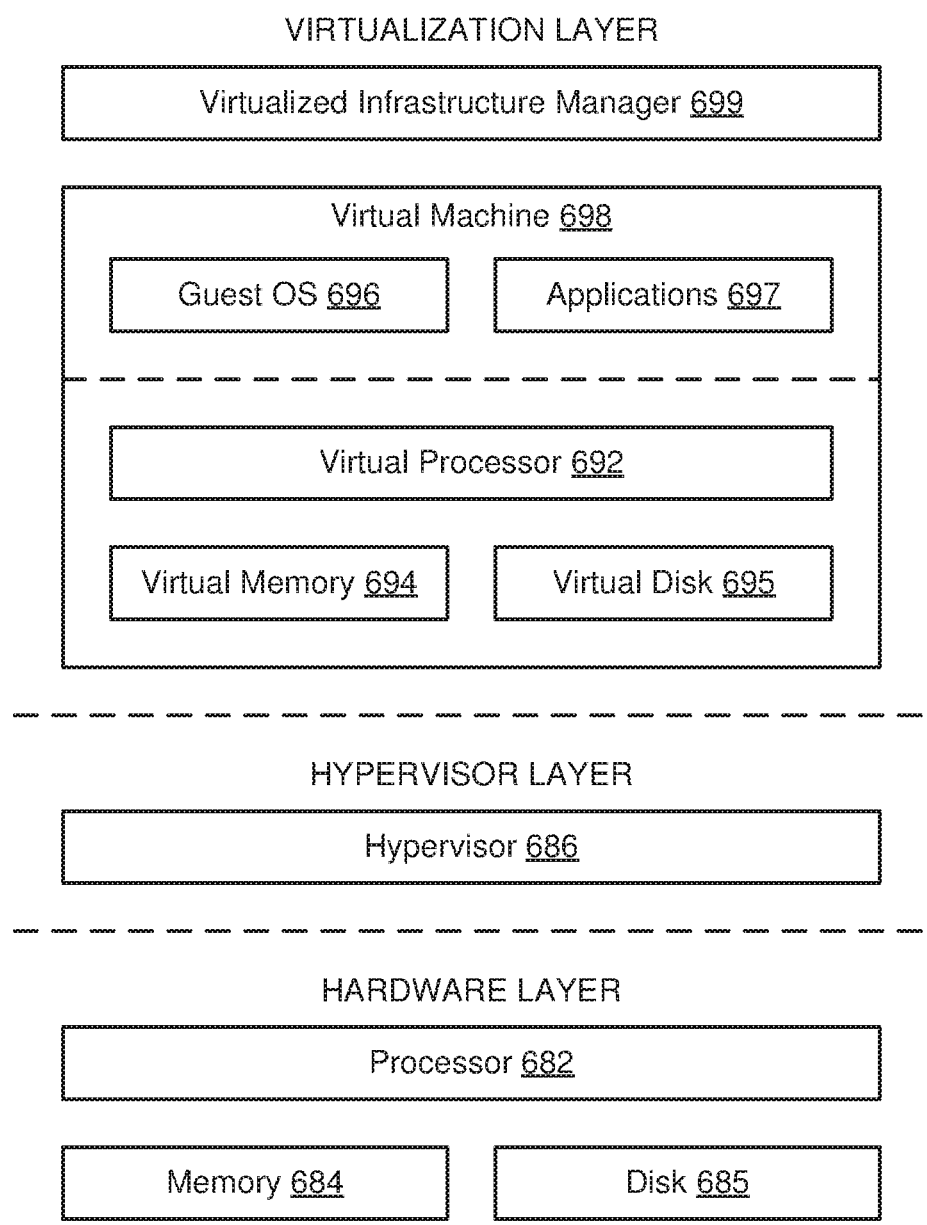
FIG. 6 is a block diagram of a virtual machine, according to one embodiment.

FIG. 6 is a block diagram of a server for a VM platform, according to one embodiment. The server includes hardware-level components and software-level components. The hardware-level components include one or more processors 682, one or more memory 684, and one or more storage devices 685. The software-level components include a hypervisor 686, a virtualized infrastructure manager 699, and one or more virtual machines 698. The hypervisor 686 may be a native hypervisor or a hosted hypervisor. The hypervisor 686 may provide a virtual operating platform for running one or more virtual machines 698. Virtual machine 698 includes a virtual processor 692, a virtual memory 694, and a virtual disk 695. The virtual disk 695 may comprise a file stored within the physical disks 685. In one example, a virtual machine may include multiple virtual disks, with each virtual disk associated with a different file stored on the physical disks 685. Virtual machine 698 may include a guest operating system 696 that runs one or more applications, such as application 697. Different virtual machines may run different operating systems. The virtual machine 698 may load and execute an operating system 696 and applications 697 from the virtual memory 694. The operating system 696 and applications 697 used by the virtual machine 698 may be stored using the virtual disk 695. The virtual machine 698 may be stored as a set of files including (a) a virtual disk file for storing the contents of a virtual disk and (b) a virtual machine configuration file for storing configuration settings for the virtual machine. The configuration settings may include the number of virtual processors 692 (e.g., four virtual CPUs), the size of a virtual memory 694, and the size of a virtual disk 695 (e.g., a 10 GB virtual disk) for the virtual machine 695.

The virtualized infrastructure manager 699 may run on a virtual machine or natively on the server. The virtualized infrastructure manager 699 corresponds to the virtualization module 106 above and may provide a centralized platform for managing a virtualized infrastructure that includes a plurality of virtual machines. The virtualized infrastructure manager 699 may manage the provisioning of virtual machines running within the virtualized infrastructure and provide an interface to computing devices interacting with the virtualized infrastructure. The virtualized infrastructure manager 699 may perform various virtualized infrastructure related tasks, such as cloning virtual machines, creating new virtual machines, monitoring the state of virtual machines, and facilitating backups of virtual machines.

Figure 7:
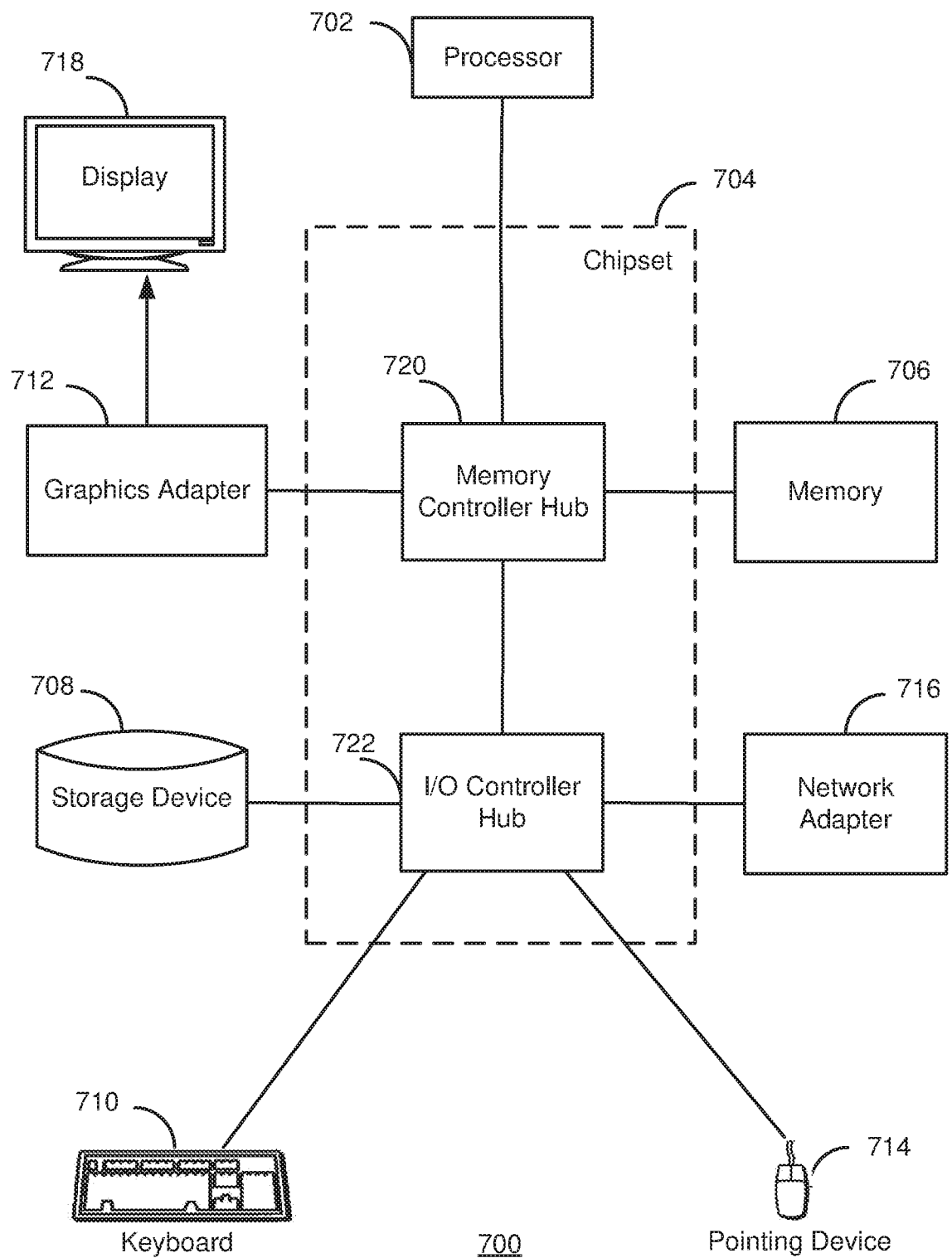
FIG. 7 is a block diagram of a computer system suitable for use in a DMS system, according to one embodiment.

FIG. 7 is a high-level block diagram illustrating an example of a computer system 700 for use as one or more of the components shown above, according to one embodiment. Illustrated are at least one processor 702 coupled to a chipset 704. The chipset 704 includes a memory controller hub 720 and an input/output (I/O) controller hub 722. A memory 706 and a graphics adapter 712 are coupled to the memory controller hub 720, and a display device 718 is coupled to the graphics adapter 712. A storage device 708, keyboard 710, pointing device 714, and network adapter 716 are coupled to the I/O controller hub 722. Other embodiments of the computer 700 have different architectures. For example, the memory 706 is directly coupled to the processor 702 in some embodiments.

The storage device 708 includes one or more non-transitory computer-readable storage media such as a hard drive, compact disk read-only memory (CD-ROM), DVD, or a solid-state memory device. The memory 706 holds instructions and data used by the processor 702. The pointing device 714 is used in combination with the keyboard 710 to input data into the computer system 700. The graphics adapter 712 displays images and other information on the display device 718. In some embodiments, the display device 718 includes a touch screen capability for receiving user input and selections. The network adapter 716 couples the computer system 700 to a network. Some embodiments of the computer 700 have different and/or other components than those shown in FIG. 7. For example, the envoy 252, the virtual machine 102, the physical machine 104, and/or the DMS node 110 can be formed of multiple blade servers and lack a display device, keyboard, and other components.

The computer 700 is adapted to execute computer program modules for providing functionality described herein. As used herein, the term "module" refers to computer program instructions and/or other logic used to provide the specified functionality. Thus, a module can be implemented in hardware, firmware, and/or software. In one embodiment, program modules formed of executable computer program instructions are stored on the storage device 708, loaded into the memory 706, and executed by the processor 702.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A method for pulling a snapshot of data for a first virtual machine of a tenant executing on a multi-tenant compute infrastructure, the method comprising:
   allocating a computing resource of the multi-tenant compute infrastructure associated with the tenant to an envoy, the envoy being connected with the first virtual machine via a virtual tenant network of the multi-tenant compute infrastructure, the envoy providing a data management and storage (DMS) cluster including a peer DMS node with access to the first virtual machine via the virtual tenant network, the computing resource including a virtual disk, the envoy being a second virtual machine within the tenant executing on the multi-tenant compute infrastructure;
   establishing a connection with the DMS cluster to provide the DMS cluster an access to the first virtual machine via the virtual tenant network;
   retrieving, via the peer DMS node, a data fetch job for the first virtual machine from a job queue accessible to the peer DMS node;
   upon retrieving the data fetch job, sending, via the envoy, a request to generate the snapshot of the first virtual machine from the peer DMS node to a virtualization module of the first virtual machine;
   generating, via the envoy, the snapshot of the first virtual machine by the DMS cluster;
   storing the snapshot of the first virtual machine in the virtual disk; and
   sending the snapshot to the peer DMS node of the DMS cluster from the virtual disk via the connection.

2. The method of claim 1, wherein the multi-tenant compute infrastructure restricts access by the DMS cluster to an infrastructure network connecting physical machines including a physical machine that executes the first virtual machine.

3. The method of claim 2, wherein the infrastructure network includes a first transmission control protocol (TCP) network and the virtual tenant network includes a second TCP network isolated from the first TCP network.

4. The method of claim 2, wherein the infrastructure network and the virtual tenant network use different network layers and share a physical layer.

5. The method of claim 1, wherein the envoy establishing the connection with the DMS cluster includes the envoy sending a secure socket layer (SSL) certificate to the DMS cluster.

6. The method of claim 1, further comprising, prior to sending the snapshot from the first virtual machine to the peer DMS node, the envoy encrypting the snapshot.

7. The method of claim 1, wherein the DMS cluster includes a distributed data store implemented across a plurality of peer DMS nodes of the DMS cluster including at least the peer DMS node, and the method further includes the peer DMS node storing the snapshot of an application in the distributed data store.

8. The method of claim 1, wherein the computing resource is allocated to the envoy while the first virtual machine is executing on the multi-tenant compute infrastructure.

9. The method of claim 1, further comprising:
   generating, via a second envoy of the multi-tenant compute infrastructure, a second snapshot of a second virtual machine in parallel with a first envoy generating a first snapshot of the first virtual machine, wherein the envoy is the first envoy and the snapshot is the first snapshot; and
   sending, via the second envoy, the second snapshot to the DMS cluster.

10. The method of claim 1, further comprising:
    establishing a second connection between the envoy and the first virtual machine based on sending a secure socket layer (SSL) certificate to the first virtual machine, the connection being a first connection.

11. The method of claim 1, further comprising:
    generating the data fetch job for the first virtual machine; and
    placing the data fetch job in the job queue accessible to a plurality of peer DMS nodes of the DMS cluster including at least the peer DMS node to schedule the data fetch job.

12. The method of claim 11, wherein the peer DMS node generates the data fetch job and places the data fetch job in the job queue stored in a distributed database of the DMS cluster.

13. The method of claim 1, wherein the multi-tenant compute infrastructure restricts an access by the DMS cluster to a second virtual tenant network of a second tenant of the multi-tenant compute infrastructure, and wherein the virtual tenant network is a first virtual tenant network.

14. The method of claim 13, wherein the first virtual tenant network and the second virtual tenant network use different network layers and share a physical layer.

15. The method of claim 1, further comprising the envoy removing the snapshot from the virtual disk subsequent to sending the snapshot to the peer DMS node.

16. A data management and storing system comprising a multi-tenant compute infrastructure, comprising:
    a first virtual machine of a tenant of the multi-tenant compute infrastructure;
    a virtual tenant network;
    one or more processors configured to execute data to provide the first virtual machine of the tenant; and
    an envoy allocated from a computing resource of the multi-tenant compute infrastructure, the envoy being connected to the first virtual machine via the virtual tenant network, the computing resource including a virtual disk, the envoy being a second virtual machine within the tenant executing on the multi-tenant compute infrastructure, the envoy configured to:
      establish a connection with a data management and storage (DMS) cluster including peer DMS nodes to provide the DMS cluster an access to the first virtual machine via the virtual tenant network;
      retrieve, via a peer DMS node of the peer DMS nodes, a data fetch job for the first virtual machine from a job queue accessible to the peer DMS node;
      upon retrieving the data fetch job, send, via the envoy, a request to generate a snapshot of the first virtual machine from the peer DMS node to a virtualization module of the first virtual machine;
      generate, via the envoy, the snapshot of the first virtual machine by the DMS cluster;
      store the snapshot of the first virtual machine in the virtual disk; and
      send the snapshot to the peer DMS node of the DMS cluster from the virtual disk via the connection.

17. A non-transitory computer-readable medium comprising instructions that when executed by one or more processors configures the one or more processors to:
- allocate a computing resource of a multi-tenant compute infrastructure associated with a tenant to an envoy, the envoy being connected with a first virtual machine via a virtual tenant network of the multi-tenant compute infrastructure, the envoy providing a data management and storage (DMS) cluster including peer DMS nodes with access to the first virtual machine via the virtual tenant network, the envoy being a second virtual machine within the tenant executing on the multi-tenant compute infrastructure, the computing resource including a virtual disk;
- establish a connection between the envoy and the DMS cluster including a peer DMS node to provide the DMS cluster an access to the first virtual machine via the virtual tenant network;
- retrieving, via the peer DMS node, a data fetch job for the first virtual machine from a job queue accessible to the peer DMS node;
- upon retrieving the data fetch job, sending, via the envoy, a request to generate a snapshot of the first virtual machine from the peer DMS node to a virtualization module of the first virtual machine;
- generate, via the envoy, a snapshot of the first virtual machine by the DMS cluster; and
- send the snapshot to the peer DMS node of the DMS cluster from the virtual disk via the connection.

* * * * *